(12) United States Patent
Fulgoni et al.

(10) Patent No.: US 7,181,412 B1
(45) Date of Patent: Feb. 20, 2007

(54) SYSTEMS AND METHODS FOR COLLECTING CONSUMER DATA

(75) Inventors: Gian Fulgoni, Chicago, IL (US);
Magid Abraham, Great Falls, VA (US);
Michael Brown, Haradon, VA (US);
Adam Davis, Silverspring, MD (US);
Bryan Miller, Ellicott City, VA (US)

(73) Assignee: comScore Networks Inc., Reston, VA (US)

( * ) Notice: Subject to any disclaimer, the term of this patent is extended or adjusted under 35 U.S.C. 154(b) by 0 days.

(21) Appl. No.: 09/532,890

(22) Filed: Mar. 22, 2000

(51) Int. Cl.
*G06F 17/30* (2006.01)

(52) U.S. Cl. .............................. 705/10; 705/26; 705/27; 705/14; 709/203; 709/219; 709/227; 709/206; 709/217; 235/375; 235/379; 235/380; 707/1

(58) Field of Classification Search .................. 705/10, 705/1, 14, 26, 27; 709/203, 219, 227, 206; 709/217; 213/375, 379, 380; 707/1
See application file for complete search history.

(56) References Cited

U.S. PATENT DOCUMENTS

| 4,355,372 A | 10/1982 | Johnson et al. |
| RE31,951 E | 7/1985 | Johnson et al. |
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,526,427 A | 6/1996 | Thomas et al. |
| 5,550,928 A | 8/1996 | Lu et al. |
| 5,584,050 A | 12/1996 | Lyons |
| 5,594,934 A | 1/1997 | Lu et al. |
| 5,659,469 A | 8/1997 | Deaton et al. |

(Continued)

FOREIGN PATENT DOCUMENTS

WO    WO 96/41495    12/1996

(Continued)

OTHER PUBLICATIONS

Choo C. W. et al., "A behavioral model for information seeking on the Web: preliminary results of a study of how managers and IT specialists use the Web" ASIS'98, Information Access in the Global Information Economy. Proceedings of the 61st Annual Meeting of the American Society for Information Science, vol. 35, Inf. Today Medford, NJ, USA, 1998, pp. 290-302, XP009056075.

(Continued)

*Primary Examiner*—James A Reagan
(74) *Attorney, Agent, or Firm*—Fish & Richardson P.C.

(57) ABSTRACT

All of an internet user's internet data is routed to a known domain on the internet, from which it is routed on to the intended recipient. The domain includes proxy servers which proxy the user's WWW data requests to the domain, and database servers which filter and build a database of the user's internet usage. Particular data concerning certain behaviors of interest, such as purchasing data, is filtered into the database, and can form the basis for numerous market measures.

16 Claims, 3 Drawing Sheets

U.S. PATENT DOCUMENTS

| | | | |
|---|---|---|---|
| 5,675,510 | A | 10/1997 | Coffey et al. |
| 5,710,887 | A * | 1/1998 | Chelliah et al. ............... 705/26 |
| 5,715,399 | A | 2/1998 | Bezos |
| 5,737,025 | A | 4/1998 | Dougherty et al. |
| 5,737,026 | A | 4/1998 | Lu et al. |
| 5,751,450 | A | 5/1998 | Robinson |
| 5,771,307 | A | 6/1998 | Lu et al. |
| 5,850,249 | A | 12/1998 | Massetti et al. |
| 5,862,325 | A * | 1/1999 | Reed et al. ............... 704/270.1 |
| 5,889,548 | A | 3/1999 | Chan |
| 5,970,469 | A * | 10/1999 | Scroggie et al. ............... 705/14 |
| 6,026,368 | A | 2/2000 | Brown et al. |
| 6,058,381 | A | 5/2000 | Nelson |
| 6,070,145 | A | 5/2000 | Pinsley et al. |
| 6,115,680 | A | 9/2000 | Coffee et al. |
| 6,128,624 | A * | 10/2000 | Papierniak et al. ........... 705/10 |
| 6,138,162 | A * | 10/2000 | Pistriotto et al. ........... 709/218 |
| 6,421,733 | B1 | 7/2002 | Tso et al. |
| 2001/0014915 | A1 | 8/2001 | Blumenau |
| 2001/0020242 | A1 | 9/2001 | Gupta et al. |
| 2002/0069368 | A1 | 6/2002 | Hines |
| 2002/0128803 | A1 | 9/2002 | Skinner et al. |
| 2002/0178257 | A1 | 11/2002 | Cerrato |
| 2003/0033432 | A1 | 2/2003 | Simpson et al. |
| 2003/0076305 | A1 | 4/2003 | Allen |

FOREIGN PATENT DOCUMENTS

| | | |
|---|---|---|
| WO | WO 98/31155 | 7/1998 |
| WO | WO 200055783 | 9/2000 |
| WO | WO 200152462 | 7/2001 |
| WO | WO 200250694 A1 * | 6/2002 |
| WO | WO 03/067376 | 8/2003 |

OTHER PUBLICATIONS

Chan, Yuen-Yan, "On privacy issues of Internet access services via proxy servers," Secure Networking—Core 'Secure!' 99, International Exhibition and Congress. Proceedings (Lecture Notes in Computer Science vol. 1740) Springer-Verlag Berlin, Germany, 1999, pp. 183-191, XP09055060.

Boyan, J. "The Anonymizer—Protecting User Privacy on the Web," Computer-Mediated Communication Magazine, 'Online! 1997, XP002231197, http://www.december.com/cmc/mag/1997/sep/toc.html, retrieved on 1997.

Oppliger, R. "Privacy protection and anonymity services for the World Wide Web (WWW)," Future Generations Computer Systems, Elsevier Science Publishers, Amsterdam, NL, vol. 16, No. 4, Feb. 2000, pp. 379-391, XP004185850.

Dossick, S. E. et al., "WWW access to legacy client/server applications," Computer Networks and ISDN Systems, North Holand Publishing, Amsterdam, NL, vol. 28, No. 11, May 1996, pp. 931-940, XP004018197.

Chapman D. B. et al., "Building Internet Firewalls Proxy Systems," Building Internet Firewalls, Sep. 1995, pp. 189-205, XP002911985.

Zenel, B., "A General Purpose Proxy Filtering Mechanism Applied to the Mobile Environment," Wireless Networks, ACM, US, vol. 5, No. 5, Oct. 1999, pp. 391-409.

Diffie W. et al., "Privacy and Authentication: An Introduction to Crytopgraphy" Proceedings of the IEEE, IEEE. New York, US, vol. 67, No. 3, Mar. 1979, pp. 397-426, XP000575227.

Mambo, M. et al., "Proxy Cryptosystems: Delegation of the Power to Decrypt Ciphertexts" IEICE Transactions of Fundamentals of Electronics, Communications and Computer Sciences, Institute of Electronics Information and Comm. Eng. Tokyo, JP, vol. E80-A, No. 1, Jan. 1997, pp. 54-63, XP000742245.

Lee, J. et al., "Visualization and Analysis of Clickstream Data of Online Stores for Understanding Web Merchandising," IBM Institute of Advanced Commerce Technical Papers, 'Online!, Jan. 1, 2000, XP002208026, http://www.research.ibm.com/iac/papers/lee.pdf, retrieved on 2000.

Zaiane O. R. et al., "Discovering Web access patterns and trends by applying OLAP and data mining technology on Web logs," Research and Technology Advances in Digital Libraries, 1998, ADL 98, Proceedings, IEEE International Forum on Santa Barbara, CA, US Apr. 22-24, 1998, Los Alamitos, CA, USA, IEEE Compt. Soc. US Apr. 22, 1998, pp. 19-29, XP010276880.

International Search Report mailed Nov. 8, 2005 for International Application No. EP 01922473.

* cited by examiner

SYSTEMS AND METHODS FOR COLLECTING CONSUMER DATA

BACKGROUND OF THE INVENTION

1. Field of the Invention

The present invention relates to systems and methods useful for collecting consumer data, and more particularly to systems and methods for collecting data representative of consumer buying habits over networks.

2. Brief Description of the Related Art

Consumer decision making has been a focus for many years. Companies that are attempting to meet a particular need in the marketplace, or that are attempting to find out how their products or services are being received by the consumer, will often conduct market research to attempt to quantify attributes or characteristics of a particular consumer segment. If performed well, the data extracted from this research can inform companies about how their products or services are perceived and bought by purchasers or potential purchasers in the marketplace, and how the companies' products or services can be changed to achieve the companies' business goals.

Traditionally, there have been numerous other general protocols for performing consumer-oriented market research. A pool of consumers is first selected, and then each individual person in the pool is asked to provide information about themselves, their purchasing and perceptions of products or services, and/or their buying decisions, among other things. Many different ways have been proposed in the past for eliciting and recording this information from the individual consumer. For example, for television viewing habits, an electronic device has been attached to the television consumer's television set which is capable of recording which specific channels were tuned in, at what time, and for how long.

Perhaps the most simple prior protocol for collecting such data has been to simply ask the consumers to write down data about their buying habits, or to survey a random selection of people either personally, over the telephone, or by using a mailed survey.

Other prior data collection protocols concerned collecting data about consumers' buying habits. For example, one prior protocol involved the consumer being given an electronic device which includes a Universal Product Code (UPC) (bar code) scanner. The consumer was requested to scan in every item that the consumer bought over a period of time, and to enter other information regarding the purchase (e.g., at what retailer the purchase was made). The consumer then connected the device to an intelligent modem. The device would dial up and connect to a host computer, and upload the scanned information to the host computer to be collected and processed.

Another data collection protocol, commonly used by consumer package goods retailers, is to ask the consumer to show an ID card at checkout. The check-out clerk then inputs the ID number and scans the items bought for both pricing and gathering data about the consumer's grocery buying habits. The retailer then can use this data about the individual consumer to make consumer-specific promotional offers. Data from many consumers can be merged together and sold to another party for marketing intelligence, or the like.

The above prior data collection protocols suffer from numerous deficiencies, in the traditional and modern marketplace. In particular, it has proven difficult to adapt these protocols to internet-based electronic commerce. Compared to the relative ease by which consumers are able to receive information and make decisions based on information from the internet, prior data collection protocols are cumbersome, do not interface well (if at all) with computer-based consumer activity, and are therefore not well suited for collecting data about internet-based activity.

Some internet-activity monitoring has been proposed. For example, a server-side consumer data collection strategy has been proposed in which an individual internet content provider ("website") monitors and collects data about each consumer who has requested data from ("visited") the website, and then compiles this data about all the consumers who have visited that website. This data could include purchases; the specific type or subject of information requested from the site; and the like. Furthermore, the website also collects data about how frequently particular files or groups of files ("webpage") have been visited (commonly referred to as "click through hits"), that is, a measure of the popularity of a particular website or webpage. This is one form of server-side data collection.

Another form of server-side consumer data collection requires a consumer to visit a particular website specifically for the purpose of providing information about that individual's buying habits, in return for which the website compensates the individual, with incentives such as money, gifts, credits, or the like.

Data collection directly from an internet consumer's computer has also been proposed, i.e., client-side data collection. Such systems commonly involve installing a large and cumbersome software application onto the consumer's computer, which operates at the same time as internet browser application software. The software then collects data about the consumer's internet usage, i.e., which websites the consumer has visited. The data is then uploaded to a data collecting computer on the internet.

These prior internet activity protocols and systems have numerous disadvantages and deficiencies. While both the above server-side and client-side data collection systems are capable of collecting data about a particular consumer, they both suffer from certain failings. For example, prior server-side systems only are capable of collecting data about a consumer's activities at a single website, as it is that website itself that is collecting the data. If the consumer clicks-through to another site, e.g., an advertiser's site, the consumer and their information is thereafter lost. Furthermore, it is difficult for server-side systems to collect data about the consumer, such as age, income level, marital status, and other demographic, economic, and personal information, which would allow the data to be compared with consumer databases from other source. Many consumers are simply unwilling to give this sensitive information to an otherwise unknown party without some incentive being provided. Thus, in order to get statistically significant market data, the website would have to be visited by an enormous number of internet consumers.

Prior client-side systems likewise suffer from different, but nevertheless severe, deficiencies. Because prior client-side systems require the use of an additional application to gather data, which application runs on the consumer's computer at the same time as the consumer's internet browser, the computer is slowed down by the added impact on its system's resources. Thus, the consumer notices a delay in the operation of her computer, which is not acceptable to many consumers. Uploading collected data also takes away from internet bandwidth, which also is unacceptable to many consumers. In order to interpret the raw data from the internet that this specialized software shares with the internet browser, it is necessary for the client-side software to include data or instructions which allows the software to interpret the data from specific websites. When these specific websites change the format of the data they send to internet consumers, the specialized software must be updated so that the new data format(s) can be properly interpreted. Thus, when a website changes the layout or content of a webpage that the client-side software is supposed to monitor, the client-side software on each participating internet consumer's computer must be updated. As will be immediately appreciated, this can be a large, cumbersome, and expensive undertaking. Because the software installed on the client-side computer is complicated, it is also not unusual for technical problems to occur. This necessitates the maintenance of a large customer service center to help answer consumer's questions and solve their problems. This can also be a very expensive undertaking.

Furthermore, such client-side systems require a very large sample size of internet users in order to have statistically significant data, because the number of internet users who visit a website is much greater than the number of internet consumers who perform some internet activity, such as making a purchase, listening to a sound or song, watching a video, or requesting a specific type of information. Because of the expensive features of prior client-side systems, the costs per panelist to maintain these measurement systems are extraordinarily high.

SUMMARY OF THE INVENTION

According to a first exemplary embodiment, a method of collecting data relating to a user's transactions over an unsecure network, the user utilizing a computing device to send and receive data sets over the network, the computing device having an address on the network, the data sets including data representative of the address of the computing device on the network, comprises the steps of directing all data sets from the computing device to a known domain, assigning a unique identifier to the computing device, readdressing data sets sent from the computing device to indicate that the data sets originated in the known domain, recording at least part of the data sets, and sending the readdressed data onto the network.

According to a second exemplary embodiment, a system for collecting data relating to a user's transactions over an unsecure network, the user using a computing device configured to send and receive data sets over the network, the computing device having an address on the network, the data sets including data representative of the address of the computing device on the network, comprises logic configured to assign a unique identifier to the computing device, logic configured to readdress data sets sent from the computing device to indicate that the data sets originated in the known domain, logic configured to record at least part of the data sets, and logic configured to send the readdressed data onto the network.

According to a third exemplary embodiment, a system for collecting data relating to a consumer's transactions over an unsecure network, the consumer using a computing device configured to send and receive data sets over the network, the data sets including data representative of the address of the computing device on the network, the network including a content server, comprises logic configured to send data to and receive data from the consumer over the network, logic configured to negotiate a first encryption key with the consumer's computing device, and logic configured to negotiate a second encryption key with the content server.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DETAILED DESCRIPTION

Figure 1:
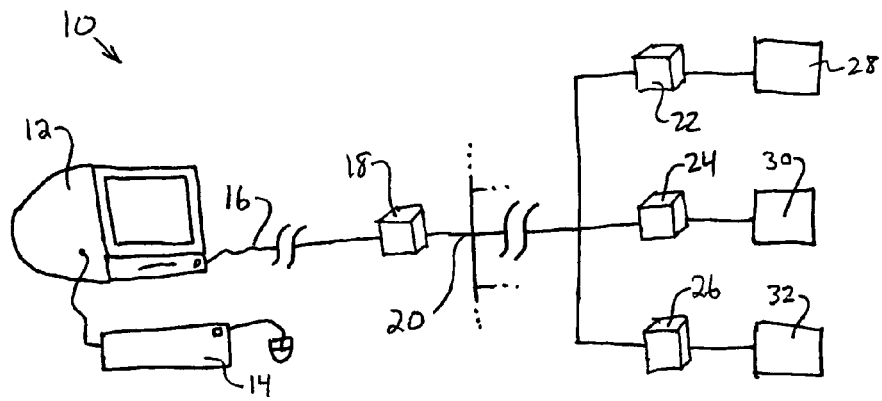
FIG. 1 schematically illustrates a prior network configuration.

Referring to the drawing figures, like reference numerals designate identical or corresponding elements throughout the several figures.

The present invention relates to systems and methods useful for collecting data indicative or representative of a specific internet user's activity. A domain is established with proxy servers and data servers to which all of a single internet user's activity is routed, which enables all of the activity to be filtered and data to be collected about specific types of activity and stored on the data servers. The domain is established on the internet, and by simply instructing the user's internet browser to route all internet traffic from the user through the domain, the domain can perform whatever data collection is desired without the user suffering from delays in webpage retrieval and the like. Enrollment in the system of the present invention would be entirely voluntary on the part of the individual internet user, and the enrolled internet user would be provided some incentive in return for allowing the system to have all of that user's internet traffic routed through the system's domain. Furthermore, specific information about the internet user could be gathered as a prerequisite for enrollment, which enriches the data collected about that user's internet usage habits and permits inter-database comparisons.

Systems of the present invention allow server-side data collection, but do not suffer from the failings described above, because all of the internet traffic of a single internet user is monitored, and not only a single user's activity at a single site. Therefore, for a single user, data can be collected indicative of usage of all sites while maintaining excellent data integrity and completeness. Different from client-side systems, systems and methods in accordance with the present invention do not demand significant computing resources, nor require an expensive customer service center. Furthermore, when websites change the formats of their webpages, only the data resident on the proxy servers in the domain of the present invention need be updated, which can dramatically reduce costs. As a result of one or more of the advantageous features of the present invention, many or all of the problems with prior client-side systems are eliminated.

Throughout the present application, an understanding of the use and function of general purpose computing devices, including what have come to be referred to as "personal computers" ("PC"), is assumed, as those of ordinary skill in the art are very skilled in their use and function. Furthermore, an understanding of the use and function of commercially available operating systems which control some of the functions of general purpose computing devices, as well as with commercially available application software such as Netscape® Navigator® (Netscape Communications Corp., Mountain View, Calif.; netscape.com), Microsoft® Internet Explorer® (Microsoft Corp., Redmond, Wash.; microsoft.com), and proxy server application software, is assumed. Throughout the present application, a natural person who uses a computer is referred to as a "user" or a "consumer".

FIG. 1 illustrates a prior network configuration 10 over which a consumer is able to retrieve data and information, and send data and information, for a number of purposes. Configuration 10 includes a PC 12 which is in communication, either wired or wireless, with data input elements such as a keyboard and pointing device 14. PC 12 includes appropriate communications hardware and volatile and nonvolatile memory elements (not illustrated) in or on which are stored an operating system and application software which allow a user to send and receive data, and to present that data in a form which is understandable to the user. Such software includes application software commonly referred to as a "browser", such as Netscape and Internet Explorer.

PC 12 is connected to a wired or wireless communications line 16 which is connected to a computer or computing device 18. Computer 18 is preferably a general purpose computer which includes application software which controls the computer to function as a data server, and which is usually remote from PC 12. Computer 18, or its owner, can be an "internet server provider" ("ISP"), for which line 16 includes telephone, coaxial cable, or similar links between PC 16 and computer 18, as will be readily appreciated by one of ordinary skill in the art. Computer 18 can also be located on a private network, e.g., a local area network or LAN, and includes application software controlling computer 18 to function at least as a firewall, proxy server, or both.

Computer 18 is connected to what is commonly referred to as the World Wide Web or the Internet (together "WWW", not illustrated) through a communications line 20. As will be readily appreciated by one of ordinary skill in the art, FIG. 1 presents a very simple representation of the WWW, which is much more distributed than is illustrated in FIG. 1. Also in communication with the WWW are a plurality (only three are illustrated) of content data servers 22, 24, 26, (i.e., in the language of the WWW, websites), which have stored therein data or information 28, 30, 32, (e.g., webpages) respectively.

A brief discussion of some of the differences between an "intranet" and the "Internet" (which includes the World Wide Web) will be beneficial. The Internet, sometimes called simply "the Net," is a worldwide system of computer networks—a network of networks in which users at any one computer can, if they have permission, get information from any other computer (and sometimes talk directly to users at other computers). It was conceived by the Advanced Research Projects Agency (ARPA) of the U.S. government in 1969 and was first known as the ARPANet. The original aim was to create a network that would allow users of a research computer at one university to be able to "talk to" research computers at other universities. A side benefit of ARPANet's design was that, because messages could be routed or rerouted in more than one direction, the network could continue to function even if parts of it were destroyed in the event of a military attack or other disaster.

Today, the Internet is a public, cooperative, and self-sustaining facility accessible to hundreds of millions of people worldwide. Physically, the Internet uses a portion of the total resources of the currently existing public telecommunication networks. Technically, what distinguishes the Internet is its use of a set of protocols called TCP/IP (Transmission Control Protocol/Internet Protocol). Two recent adaptations of Internet technology, the intranet and the extranet, also make use of the TCP/IP protocol.

When a person or organization has a computer connected to the public portion of the Internet, the computer is assigned an internet protocol (IP) address which uniquely identifies that computer. Typically, however, the computer is assigned a set of addresses at a certain class level (A, B, C, etc.), and all of the addresses within that set are routed to that computer. If that computer is a proxy server (see discussion below) for a private network of computers, then each of the computers within the private network can be assigned a unique IP address in the set assigned to the proxy server. Thus, the computers assigned IP addresses within the set define an "intranet", because the IP addresses are all within the address set assigned to the proxy server.

The most widely used part of the Internet is the World Wide Web (often called "the Web"). Its outstanding feature is hypertext, a method of instant cross-referencing. In most Web sites, certain words or phrases appear in text of a different color than the rest; often this text is also underlined. When you select one of these words or phrases, you will be transferred to the site or page that is relevant to this word or phrase. Sometimes there are buttons, images, or portions of images that are "clickable." If you move the pointer over a spot on a Web site and the pointer changes into a hand, this indicates that you can click and be transferred to another site. Using the Web, you have access to millions of pages of information. Web "surfing" is done with a Web browser, the most popular of which are Netscape Navigator and Microsoft Internet Explorer.

In an enterprise that uses the Internet, a proxy server is a server that acts as an intermediary between a workstation user and the Internet so that the enterprise can ensure security, administrative control, and caching service. A proxy server is associated with or part of a gateway server that separates the enterprise network from the outside network and a firewall server that protects the enterprise network from outside intrusion. A proxy server receives a request for an Internet service (such as a Web page request) from a user. If it passes filtering requirements, the proxy server, assuming it is also a cache server, looks in its local cache of previously downloaded Web pages. If it finds the page, it returns it to the user without needing to forward the request to the Internet. If the page is not in the cache, the proxy server, acting as a client on behalf of the user, uses one of its own IP addresses to request the page from the server out on the Internet. When the page is returned, the proxy server relates it to the original request and forwards it on to the user.

To the user, the proxy server is invisible; all Internet requests and returned responses appear to be directly with the addressed Internet server. (The proxy is not quite invisible; its IP address has to be specified as a configuration option to the browser or other protocol program.) An advantage of a proxy server is that its cache can serve all users. If one or more Internet sites are frequently requested, these are likely to be in the proxy's cache, which will improve user response time. In fact, there are special servers called cache servers. A proxy can also do logging. The functions of proxy, firewall, and caching can be in separate server programs or combined in a single package. Different server programs can be in different computers. For example, a proxy server may be in the same machine with a firewall server or it may be on a separate server and forward requests through the firewall.

Thus, requests for data from one computer to another computer within the same assigned set of IP addresses are considered secure, because the request and the data sent in reply do not get passed to any computer not assigned an IP address within the set. When a request for data is addressed to a computer not within the set of IP addresses, the request must pass to computers which are assigned IP addresses not within the set assigned to the same person or entity, and are therefore considered insecure. This latter insecure request for data passes over the Internet, because it is passed to computers with IP addresses not in the same assigned set as the originating computer.

While the function of the system illustrated in FIG. 1 is well known to those of ordinary skill in the art, a brief summary will assist in a better understanding of the present invention. When a consumer using PC 12 wants to retrieve data (e.g., a webpage) from a website on the WWW, the user utilizes the application software on PC 12 to be assigned an internet protocol (IP) address (including a classless interdomain routing, CIDR, address), i.e., to open a connection to the WWW. The user then launches and uses the browser software to request data from a specified machine, such as server 22 on the WWW, by entering the uniform resource locator (URL) designation for the machine, and preferably the specific data file on that machine, such as data 28. The data representing this request for data is communicated to computer 18, which processes the request data to be sent out onto the WWW, typically in the form of multiple data packets, including the IP address for computer 12.

As will be readily appreciated by one of ordinary skill in the art, servers 22, 24, or 26 usually are not directly connected to computer 18, and each data packet can take a different route from computer 18 to server 22. Upon being communicated to server 22, each packet is reassembled with the other packets to reconstruct the original data request from the user. Server 22 then retrieves data 28, and processes the data for the return trip across the WWW to the user's computer 12, typically in the same manner as the user's data request. The browser software running on computer 12 then reassembles the data packets to reconstruct data 28, and presents it to the user in a particular, usually an understandable, form, and can be either static or dynamic, i.e., can itself include instructions for controlling computer 12. For example, data 28 can include software instructions, such as instructions scripted in Java™ (Sun Microsystems, Inc., Palo Alto, Calif.; javasoft.com) which are executed on the computer 12.

Thus, when a consumer using computer 12 wants to place an order for a product or service which is offered through a merchant using server 22 on the WWW, the user requests a particular data file 28 from the server 22. The data file 28 oftentimes includes data that results in a form being generated by computer 12 and displayed to the user. The user then enters information into the form using keyboard 14, and sends the filled-out form back to server 22, including data representing what the user would like to buy, and payment information, such as credit card information. Such systems and processes are well known; see, e.g., U.S. Pat. No. 5,715,399, issued to Bezos, "Secure Method and System for Communicating a List of Credit Card Numbers Over a Non-Secure Network", assigned to Amazon.com, which is incorporated by reference herein in its entirety.

Figure 2:
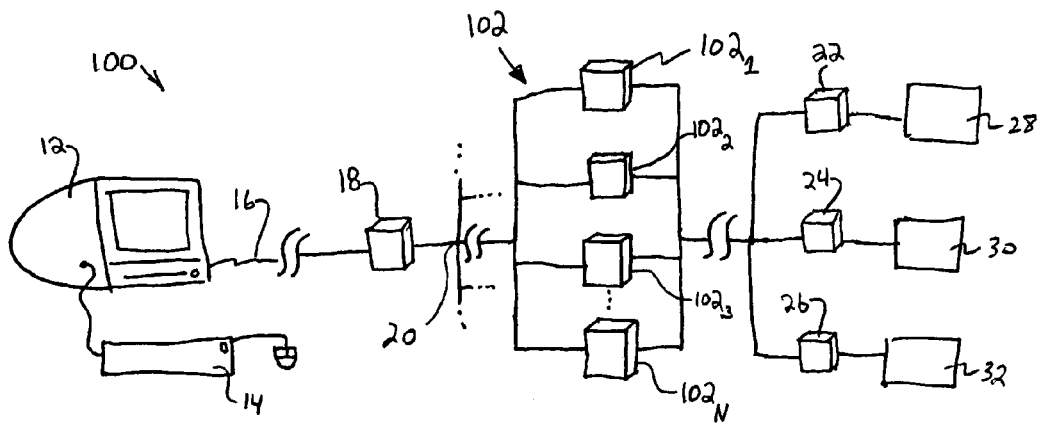
FIG. 2 schematically illustrates an exemplary embodiment of a system in accordance with the present invention.

FIG. 2 schematically illustrates an exemplary system 100 in accordance with the present invention. For purposes of brevity, individual elements included in system 100 which have been described above with reference to FIG. 1 will not be described further. System 100 includes a domain 102, which includes one or more computers and associated hardware, firmware, and software which together function as a domain on the WWW. In general, domain 102 is operatively in the path between PC 12 (and computer 18) and all other machines on the WWW, so that all of the data that is sent to and from PC 12 is routed through domain 102. As schematically illustrated in FIG. 2, however, domain 102 is on the public (WWW) side of computer 18, and is therefore not necessarily in direct communication with either computer 18 or any of servers 22, 24, 26.

Domain 102 includes at least one, and preferably a plurality of machines $102_X$, each with associated hardware, firmware, and software as discussed above. As will be readily appreciated by one of ordinary skill in the art, each machine $102_X$ ($X \in [1,N]$, wherein N is any positive integer) has a unique IP address within domain 102, and therefore can be located together or distributed throughout the WWW.

Figure 3:
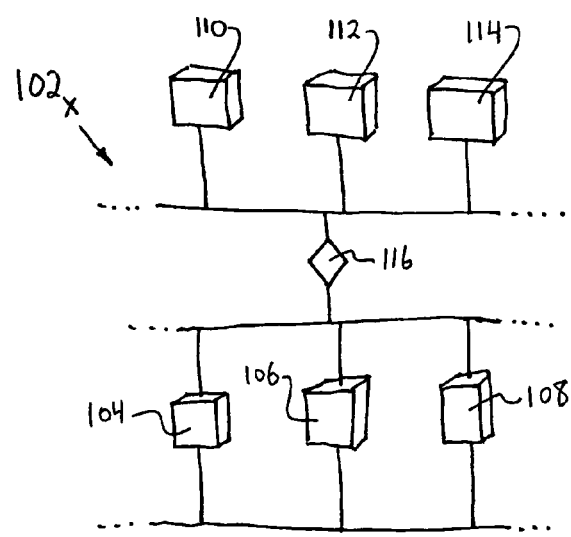
FIG. 3 schematically illustrates a portion of the system illustrated in FIG. 2.

FIG. 3 schematically illustrates an exemplary embodiment of a configuration of domain 102. Domain 102 includes at least one, and preferably numerous (only three are illustrated) proxy servers 104, 106, 108, and at least one, and preferably numerous (only three are illustrated) data servers 110, 112, 114, which are in communication with the proxy servers. For example, data servers 110, 112, 114 can be Structured Query Language (SQL) servers. Proxy servers 104, 106, 108 include proxy server application software which allow pc 12 to route requests for data through domain 102. PC 12 is therefore aliased within domain 102, which requires all of the data which is sent from PC 12 onto the WWW and all of the data from the WWW which is intended for PC 12 to be copied, processed as by a filter 116, and stored within domain 102 on data servers 110, 112, 114. Thus, a complete copy of all data addressed for PC 12 is copied within domain 102, and is filtered. Filter 116 can be constructed to retain all of the data, or to retain portions of the data in servers 110, 112, 114.

Thus, when machines such as servers 22, 24, and 26 on the WWW receive data from PC 12, because it has been routed through domain 102 and readdressed with an IP address within domain 102, data sent by server 22 (for example) which was requested by the user of PC 12 is addressed to the internet user "in care of" domain 102. Proxy server 104 (for example) receives data 28 from server 22, readdresses the data to the PC 12 based on an unique identifier (see below) at the IP address assigned (either statically or dynamically) to the PC 12, and transmits the readdressed data 28 back into the WWW. As will be readily appreciated by one of ordinary skill in the art, data 28 is then collected by server 18, and transmitted to PC 12, as discussed above. Importantly, domain 102 is not an ISP or proxy server gateway from a private network. Domain 102 is another domain on the WWW through which consumer/PC-specific data is routed, and includes a proxy server gateway onto the public WWW network. According to less preferred embodiments, domain 102 is an ISP to which computer 12 directly connects, i.e., includes computer 18.

Because each computer 12 can be dynamically assigned an IP address by computer 18, domain 102 must first be provided with unique identifying information about computer 12 to differentiate it from other computers which are similarly proxied through domain 102. This information may be identifying information provided by a component (either software or hardware) of computer 12, such as by a "cookie" returned to domain 102, a "digital certificate" returned to domain 102, CPU chip identifying information (as has recently been commercially available in Pentium® III class chips from Intel Corp., Santa Clara, Calif.; Intel- .com), or other unique identifying information as will be readily apparent to one of ordinary skill in the art.

In a preferred embodiment of the present invention, identifying information or data can be included in each data packet, preferably in the header portion of each packet, so that each packet uniquely identifies each PC 12 from which it originated. By way of example and not of limitation, one or more fields in the packet header, such as the "language" field, can include unique identifying information. Changing the value that is contained in any particular field of a packet header to include such identifying information will be readily appreciated by one of ordinary skill in the art. Again by way of example and not of limitation, the language field value, for example, can be changed so that it is, or includes in addition to a language code, a unique identifier. This change in the language field, for example, can be readily achieved by changing the browser's preferences to include the unique identifier, which can be performed manually through the application tools provided with the browser. Alternatively, this change can be achieved by executing a series of logical instructions, as embodied in software, on PC 12, as will be readily apparent to one of ordinary skill in the art. Any other field in a packet header can be used instead of or in addition to the language field within the spirit and scope of the present invention.

According to yet another aspect of the present invention, secure internet transfer protocols can be used between an internet consumer and an internet content provider while still monitoring and collecting data about the user's internet activities. As readily appreciated by one of ordinary skill in the art, when an internet consumer initially requests a secure webpage, the consumer is sent an encryption key to enable encryption and decryption of webpages sent respectively to and from that website. Thus, other machines on the internet are unable (in theory) to interpret the data passing between the internet consumer and the website when in a secure mode.

Figure 5:
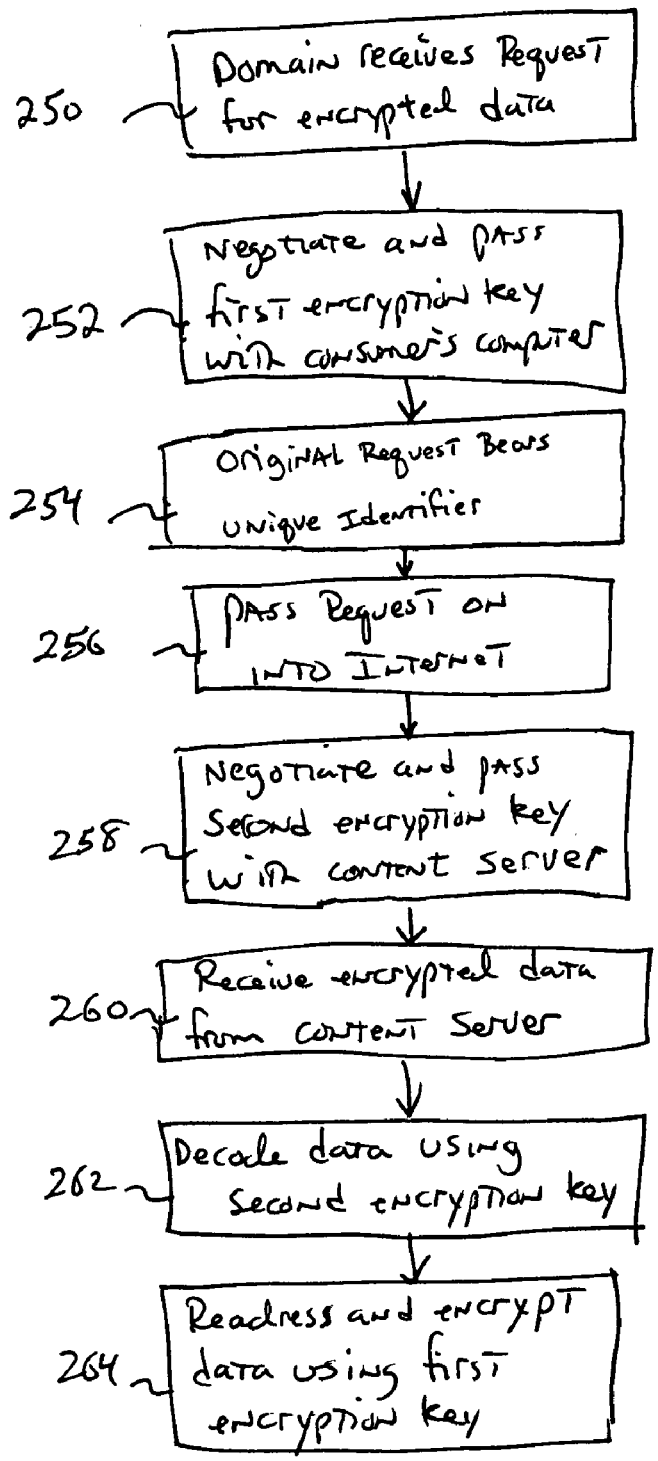

Systems in accordance with the present invention accommodate secure/encrypted communications while still monitoring internet usage and enabling data collection, as diagrammatically illustrated in FIG. 5. For example, a proxy server of domain 102 can include two servers: proxy server 106 for transferring encrypted data to and from computer 12, and proxy server 108 for transferring encrypted data to and from server 22 (for example). As will be readily apparent to one of ordinary skill in the art, servers 106 and 108 may be the same proxy server functioning as described above. Thus, when domain 102 receives a request for an encrypted webpage from computer 12 (step 250), server 106 can negotiate and pass its own encryption key to computer 12 (step 252), thus initiating a secure session with computer 12. The original request from computer 12 bearing the unique identifier for the consumer on domain 102 (step 254) is passed back into the internet by server 108 to be received by computer 22 (step 256). Computer 22 and server 108 negotiate an encryption key for the data 28, and the encryption key is passed back to server 108, bearing the consumer's unique identifier in domain 102 (step 258).

When encrypted data 28 is sent by computer 22 and received by server 108 (step 260), server 108 decodes the data using its encryption key (step 262). Server 108 passes the decoded data to server 106, which readdresses the data for delivery to computer 12 at its IP address from computer 18 and encrypts the data using the encryption key held by server 106 (step 264). Thus, proxy server 106 securely transfers data to and from computer 12, proxy server 108 securely transfers data to and from computer 22 for the consumer, and servers 106 and 108 exchange the decoded data. In a preferred embodiment of the present invention, servers 106 and 108 are the same server which performs the operations and functions described above. According to a less preferred embodiment, yet still within the spirit and scope of the present invention, servers 106 and 108 are different servers which separately perform the operations and functions described above.

Figure 4:
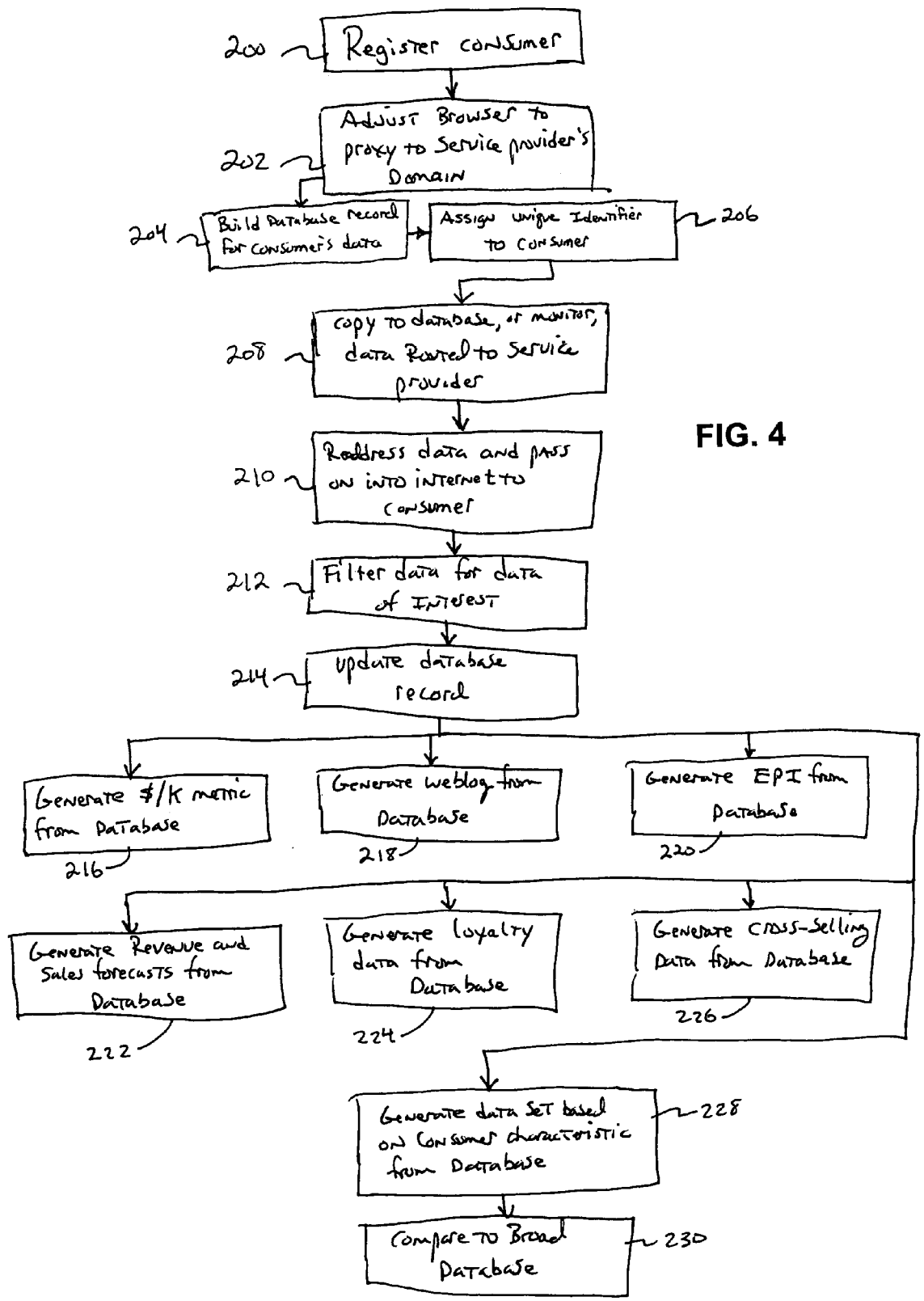
FIGS. 4 and 5 diagrammatically illustrate flow charts of steps of methods in accordance with the present invention.

The present invention also relates to methods of collecting data about computer user habits, preferences, uses, and the like, and methods of using this data. While system 100 is preferably used to perform the methods of the present invention, one of ordinary skill in the art will readily appreciate that other systems can by used without departing from the spirit and scope of the present invention. FIG. 4 diagrammatically illustrates a flow chart of steps of methods in accordance with the present invention.

As discussed above, data representative of internet consumers' behavior, including (but not exclusively) what choices the consumer makes, why particular characteristics of a product or service are important, what products or services a consumer has considered and decides not to purchase, and how much money a consumer is willing to pay and has paid for a product or service, can be a valuable product in itself. As will be readily appreciated by one of ordinary skill in the art, the quality of the data, e.g., statistical significance and error, greatly impacts how valuable the data is to a party wanting to know about a particular consumer's habits.

Methods in accordance with the present invention collect and generate data which is extremely complete for an individual user, and therefore can be very useful by itself or when correlated with other data about that user, or other consumers that share characteristics with the user. Furthermore, because the methods of the present invention do not rely on client-side data collection, but instead utilize server-side data collection, the impact on the performance of the individual consumer's computer 12 is minimal, and does not require repeated software updating as with prior systems which were resident on a computer 12.

Initially, an internet consumer must be registered so that the consumer's computer can be uniquely identified (step 200). To encourage consumers to participate in the monitoring activity, incentives may be offered to the consumer in exchange for routing all of that consumer's internet data so that it can be monitored. As will be readily appreciated by one of ordinary skill in the art, the exact nature of the compensation can vary, and can include money, gifts, and the like. Additionally or alternatively, the compensation can be in the form of faster internet access to the consumer. For example, when using system 100 described above, data can be delivered to computer 12 in compressed form from domain 102. Because of the decrease in required bandwidth required for transmitting compressed data, the consumer experiences an overall increase in data transfer rates between domain 102 and computer 12, even when factoring in decompression of the data by computer 12. Thus, the retransmission of compressed data can be an incentive for the internet consumer to agree to proxy all of their internet data through domain 102.

Commercially available browser software, such as Navigator® and Internet Explorer®, include decompression software which can be configured to automatically decompress compressed data upon receipt by PC 12. Thus, according to a preferred embodiment of the present invention, domain 102 compresses data to be sent to PC 12, resulting in faster net times between the PC requesting data and that data being delivered to the PC. By way of example and not of limitation, domain 102 can include a set of logical instructions, e.g, software, which compresses data according to a known compression routine, e.g., the Gzip compression routine. As the browser software running on PC 12 can both recognize and decompress Gzip compressed data, the internet consumer receives the benefit of faster net data transmission without the need to intervene in the process of decompressing the data with a separate decompression application or tool. The particular compression protocol used to compress and decompress the data can be any of the numerous known data compression protocols, such a "zip", "uuencode", "tar", "lzh", "MIME", "ARC", "Binhex", "sit", "hqx", etc., within the spirit and scope of the present invention, the protocol being selected so that the browser application running on PC 12 includes logic to automatically decompress data which has been compressed according to that algorithm.

Also by way of example, domain 102 can perform proxy caching, including hierarchical caching, of webpages and entire websites of predetermined interest. Thus, when a consumer requests a webpage which has been cached in domain 102, the data is served to the consumer much faster than if an original copy of the requested webpage were requested and passed through to the consumer. As data compression and proxy caching are well appreciated by one of ordinary skill in the art, further discussion of these types of compensation will not be described herein.

Of course, the decision to participate, i.e., to contract with the service provider, is entirely voluntary, and some consumers may elect not to participate. Those who do choose to participate supply the service provider with information about themselves; the exact data can vary, and could include demographic, socio-economic, geographic, and any other information commonly collected in market research studies. Such information can include, but is not limited to user age, user income level, user education level, household size, time of transmission of the data set, location of computing device, date of transmission of the data set, currency paid, type of product purchased, type of service purchased, network address of the intended recipient of a data set, click-through address, banner advertisement impression, and permission e-mail received, and combinations thereof.

Furthermore, the consumer is provided with a small application software applet which adjusts the browser application running on the consumer's computer so that it proxies to the service provider's proxy server, i.e., so that it redirects all of the consumer's outbound data to the domain 102. If the service provider is utilizing system 100, described above, the applet will reset the browser to proxy to domain 102. Publicly available browsers are provided with the ability to do this "reset" operation. The applet can be directly downloaded, shipped via a diskette, CD-ROM, or the like, or manually installed or modified by a technician who visits the consumer (step 202).

A database record is built based on the data set supplied by the consumer (step 204). A unique identifier is assigned to the consumer (step 206). Thereafter, as described above, all of the consumer's internet data will be routed to the service provider. The service provider can then copy or otherwise monitor the data (step 208), and pass on the data into the internet (step 210) without impacting the overall data transfer rate from the consumer to the data's intended destination. According to one aspect of the invention, the service provider has predetermined the formats of the webpages for a set of domains, websites, and/or webpages that are of interest to the service provider. Thus, internet traffic directed to or coming from these destinations/sources is monitored, and the data of interest filtered and collected. As other websites become of interest to the service provider, for example because consumers visit their sites, the service provider retrieves a copy of the particular webpages of interest, and determines the specific data format that the webpage includes. This determination of webpage formats can be performed manually or by an automated process, as will be readily apparent to one of ordinary skill in the art. As most webpages are formatted so as to conform with publicly known, standardized data transfer protocols (e.g., http, hypertext transfer protocol) or known scripting languages (cgi, Java™), determining the data format of most webpages will be well within the skill of one skilled in the art.

When the service provider is routed a copy of a webpage from either the consumer or a website, the service provider is able to copy the data contained in the webpage. By knowing the data format used by that website in creating the webpage, the service provider is then able to extract from the data the exact information detailing what sort of internet transaction the consumer has just engaged in. Notably, however, the service provider does not impede the transaction, but merely extracts the data about the transaction, and passes the data on to the intended recipient. The extracted data is then filtered for data elements of interest to the service provider, such as the date and time of the transaction, URL of a click-through (e.g., on a banner ad), amount of money spent, type and number of items bought, delivery method, and so on (step 212). The data record for that particular consumer is then updated with the information (step 214). As will be readily appreciated by one of ordinary skill in the art, when more than one consumer has her internet data routed through the service provider, the service provider can generate a database of consumer internet activity of great detail about any single consumer's habits, any class of consumers differentiated based on any common characteristic in the database, any single domain, website, or webpage, and/or any class of domains, websites, or webpages which share a common characteristic in the database.

The foregoing description also applies to "push" and "broadcast" internet technologies which operate on the same principle of the internet consumer requesting data and the content server delivering data to the internet consumer.

Several specific embodiments of methods in accordance with the present invention will now be described. While the following are specific embodiments of methods according to the present invention, the present invention is not limited to the specific methods described herein.

A measure or metric can be established and generated from the data collected by the service provider, such as a dollar per thousand hits on a particular webpage ("$/K metric") (step 216). The $/K metric therefore can indicate how much money is generated or received per one thousand times the particular webpage is served to any person on the internet. The $/K metric provides a useful measure for an internet content provider and/or an internet advertiser of how to price advertising rates, or how much to pay for internet advertising, respectively, based on the cost per thousand hits (CPM) versus the revenue generated by the internet advertiser per thousand hits (RPM). Furthermore, while a single internet merchant can generate its own CPM and RPM values based on the $/K metric, that internet merchant does not have the data to compare to its competitor's CPM and RPM. Thus, the service provider practicing methods in accordance with the present invention will be able to market and sell $/K metric data to internet merchant competitors without relying on the merchants themselves for the data.

In another aspect of the invention, a log of internet activity ("weblog") can be generated from the data collected by the service provider (step 218). The weblog can include a listing of the particular URLs visited by consumers, separate from the data indicating the consumers' transaction habits. Because the database generated can include data regarding consumer's demographics and the like, the database can be easily mined for data records having web hits on a particular website. This information is particularly valuable to that website's competitors, as it gives an indication of who is visiting the website, and what those individuals' characteristics are. Such "competitive intelligence" can be marketed and sold to a wide variety of parties, and in particular to the particular website's competitors.

In yet another aspect of the invention, an electronic commerce ("e-commerce") or retail price index, herein termed "EPI", can be generated from the service provider's database, based on any electronic retailer's ("e-tailer") data, mined from the database (step 220). That is, the prices of particular products can be retrieved from the database, and the relationships between time and price can be generated to provide an indication of the true market price for an item or service, or of the condition of a market as a whole.

The service provider's database can be further analyzed or mined to extract data relating to the amount of revenue a particular website generates over a particular time period or a particular number of website hits (step 222). Based on the sample size for the particular website of interest, and therefore within a known confidence interval based on known rules of statistical analysis, the service provider will be able to provide revenue projections over a given period of time for the website well in advance of the end of any particular time period or number of internet visits. As will be readily appreciated by one of ordinary skill in the art, revenue predictions for a business are very useful tools for pricing securities for that merchant, and therefore the service provider can market and sell such revenue predictions to parties interested in knowing this information before release of the actual revenue reports by the website owner to the rest of the securities market. Furthermore, sales forecasts can be used by the internet merchant for inventory control and just-in-time warehousing and delivery.

The database can also be analyzed for data representative of the frequency a particular website is visited (step 224). For example, the data filtering performed on the raw internet data received by the service provider can include tabulating the number of times a domain, website, or webpage is served to a consumer. By comparing this number to the number of times a purchase was made, a measure of the particular consumer's purchasing propensity can be generated, as well as the average amount spent per visit and per transaction. These measures can be marketed to e-tailers, or provided back to the consumer. Similarly, by retrieving from the database transactions at a single website across the database, cross-selling success can be measured (step 226). For example, for an e-tailer that sells products A and B, the database can be mined for transactions between the particular e-tailer and consumers for product A, and the e-tailer's success in also selling product B to that same consumer set can be extracted. Thus, the success of the e-tailer to cross-sell products A and B can be readily extracted, and that information can be marketed and sold to competing e-tailers.

More traditional market research data can also be easily mined from the service provider's database of internet consumer activity. For example, a particular e-tailer's total market share in a particular class of goods or services can be determined by extracting data of all transactions in that class attributable to the particular e-tailer, as well as all transactions for goods or services in the class. Similarly, for a particular consumer, the loyalty or share of the consumer's spending ("wallet") spent at a particular e-tailer or for a particular product type can be easily extracted. The percentage of the entire consumer sample pool who visited or bought goods or services a specified number of times from a particular site can be determined, which represent the trial and repeat rates for both visiting and purchasing.

Profiling or generating scoring models can also be facilitated by the service provider practicing methods in accordance with still another aspect of the present invention. For example, the database can be used to provide data records for a particular consumer characteristic, such as education level (step 228). This data set can be compared to broad demographic data sets including indicators of education level, to predict the overall probability of a certain internet activity, such as buying a product or viewing a video, by persons at that education level for the entire population represented by the broad demographic data set (step 230). Other comparisons of the service provider's database to other databases will be readily appreciated by one of ordinary skill in the art, to generate profiling data on a certain population's internet activities.

The present invention provides numerous advantages over prior server-side and client-side systems. Because of the particular systems and processes of the present invention, statistically significant consumer data can be gathered at extremely low costs per panelist when compared with prior systems.

While the invention has been described in detail with reference to preferred embodiments thereof, it will be apparent to one skilled in the art that various changes can be made, and equivalents employed, without departing from the scope of the invention.

What is claimed is:

1. A method of collecting consumer data, comprising:
   offering one or more incentives for prospective consumers to register with a provider of services;
   receiving a request at the provider of services from a consumer to register with the provider of services to receive at least one of the offered incentives;
   registering the consumer with the provider of services, wherein registering the consumer includes receiving consumer-specific information about the consumer;
   assigning a unique identifier to at least one of the registered consumer and a computer of the registered consumer that is connected to a network to record network activity of the registered consumer using the unique identifier at the provider of services, wherein the unique identifier is persistent across different network sessions and the network is the Internet;
   modifying a browser application on the registered consumer's computer to enable communications sent to and from the registered consumer's computer to be directed through the provider of services, located at a domain on the network, to record the network activity of the registered consumer;

directing at least some communications addressed to the destination server on the network from the registered consumer's computer to a server of the provider of services;

receiving at the provider of services data requests from the registered consumer's computer addressed to the destination server;

recording at the provider of services at least part of the received data requests as associated with the unique identifier;

communicating the received data requests from the provider of services to the destination server capable of fulfilling the received data requests;

receiving data at the provider of services in response to the received data requests from the destination server;

recording at the provider of services at least part of the received data as associated with the unique identifier;

communicating the received data from the provider of services to the registered consumer's computer;

aggregating the received data requests and received data associated with more than one unique identifier based on the recorded network activity of the registered consumers associated with the unique identifiers; and generating a database by the provider of services of individual and aggregated consumer network activity, wherein the individual consumer network activity includes the received data requests and the received data that is recorded as being associated with the unique identifier, and wherein the aggregated consumer network activity includes the received data requests and the received data that is aggregated as being associated with the more than one unique identifiers.

2. The method according to claim 1, wherein the offered incentives include at least one of faster network delivery and performing data caching.

3. The method according to claim 1, wherein the consumer-specific information comprises consumer age.

4. The method according to claim 1, wherein the consumer network activity includes transaction information, the transaction information including at least one of time of transmission of a data set, location of computing device, date of transmission of a data set, currency paid, type of product purchased, product purchased, type of service purchased, network address of the intended recipient of a data set, click-through address, banner advertisement impression, and permission e-mail received, and combinations thereof.

5. The method according to claim 1, wherein the recording at least part of the received data includes filtering the received data so that only data of interest is recorded.

6. The method according to claim 5, wherein the filtering is based on a known format of a web page in the received data.

7. The method according to claim 1, further comprising generating a log of the consumer network activity by the provider of services, the log including consumer demographics as well as particular URLs visited by the consumer.

8. The method according to claim 1, further comprising analyzing the database of consumer network activity to extract estimates of projected revenue of a particular entity.

9. The method according to claim 1, further comprising analyzing the database of consumer network activity to extract estimates of commerce.

10. The method according to claim 1, wherein the recording at least part of the received data requests includes:

when the provider of services receives a request for data in a secure session from a computer of the consumer, negotiating by the server of the provider of services a separate secure session with the computer of the consumer, thus initiating a secure session with computer of the consumer;

communicating the received request for data from a server of the provider of services to the destination server capable of supplying the data;

negotiating by the server of the provider of services another secure session with the destination server for the requested data;

receiving at the server of the provider of services the requested data sent by the destination server during the secure session with the destination server;

recording at least part of the data received from the destination server at the provider of services; and re-addressing the received data for delivery to the computer of the consumer during the secure session between the server of the provider of services and the computer of the consumer, whereby the server of the provider of services securely transfers data to and from the computer of the consumer to the destination server and at a same time monitors the content of the secured data.

11. The method according to claim 10, wherein the request for data is augmented with the unique identifier when transmitted to the destination server.

12. The method according to claim 1, wherein provider of services is independent of providers of access to the Internet.

13. The method according to claim 1, wherein the consumer-specific information comprises consumer income level.

14. The method according to claim 1, wherein the consumer-specific information comprises consumer education level.

15. The method according to claim 1, wherein the consumer-specific information comprises consumer gender.

16. The method according to claim 1, wherein the consumer-specific information comprises consumer household size.

* * * * *